(12) United States Patent
Cunic

(10) Patent No.: US 11,576,361 B2
(45) Date of Patent: Feb. 14, 2023

(54) FLY FISHING STRIKE INDICATOR HAVING MULTIPLE TRAPPED AIR ENCLOSURES

(71) Applicant: Stephen William Cunic, Bethlehem, PA (US)

(72) Inventor: Stephen William Cunic, Bethlehem, PA (US)

( * ) Notice: Subject to any disclaimer, the term of this patent is extended or adjusted under 35 U.S.C. 154(b) by 191 days.

(21) Appl. No.: 16/599,966

(22) Filed: Oct. 11, 2019

(65) Prior Publication Data

US 2020/0068864 A1 Mar. 5, 2020

Related U.S. Application Data

(63) Continuation-in-part of application No. 16/116,457, filed on Aug. 29, 2018, now abandoned.

(51) Int. Cl.
*A01K 93/00* (2006.01)
*A01K 97/12* (2006.01)

(52) U.S. Cl.
CPC .............. *A01K 93/00* (2013.01); *A01K 97/12* (2013.01)

(58) Field of Classification Search
CPC ......... A01K 93/00; A01K 93/02; A01K 97/12
USPC ................... 43/17, 43.14, 43.15, 44.9, 44.91
See application file for complete search history.

(56) References Cited

U.S. PATENT DOCUMENTS

| 3,087,275 | A | * | 4/1963 | Svoboda | A01K 93/00 43/44.87 |
| 3,107,451 | A | * | 10/1963 | Sitzler | A01K 93/00 43/44.87 |
| 5,575,104 | A | * | 11/1996 | Wilding | A01K 85/01 206/315.11 |
| 5,921,013 | A | * | 7/1999 | Kaczynski, Sr. | A01K 93/00 43/4.5 |
| 7,621,069 | B2 | * | 11/2009 | Holtskampf | A01K 91/04 43/42.39 |

* cited by examiner

*Primary Examiner* — David J Parsley
(74) *Attorney, Agent, or Firm* — Design IP

(57) ABSTRACT

The strike indicator includes a float formed from a plurality of sealed air enclosures, each of the plurality of sealed air enclosures including an outer membrane, each of the plurality of sealed air enclosures being entirely offset from the center of the float. The strike indicator also includes a line attachment device configured to secure a fishing line therein, the line attachment device being attached to the float and located in a center of the float between the plurality of sealed air enclosures. The line attachment device includes a threaded bolt having an L-shaped or V-shaped notch formed in its shaft, wherein a fishing line can be inserted in the notch to secure the strike indicator to the fishing line.

18 Claims, 5 Drawing Sheets

FLY FISHING STRIKE INDICATOR HAVING MULTIPLE TRAPPED AIR ENCLOSURES

BACKGROUND

A strike indicator, often colloquially called a "bobber," is a buoyant fishing accessory that is attached to a fishing line and, when cast in water, floats above the water surface and in view of the angler. In so doing, the strike indicator suspends an attached bait or weight at a predetermined depth on the fishing line. The strike indicator also helps the angler determine the depth of the water in which s/he is fishing, and when a fish bites the fishing line, it pulls the strike indicator either along or underneath the water surface, thereby notifying the angler of the bite.

One type of strike indicator is a trapped air indicator, which comprises a closed-cell hollow float that seals air inside the float to achieve buoyancy. Trapped air indicators are popular due to their predictable buoyancy, visibility, and reusability. Trapped air indicators can also be customized with respect to size and buoyancy for different water types.

Most trapped air indicators in the art are made from a rigid plastic, such as high-density polyethylene (HDPE), that is durable and has low permeability to ensure that air and water do not escape or enter the indicator. Unfortunately, such indicators tend to have hard surfaces that, when contacting the water surface upon being cast, create significant disturbances in the water that frighten fish away from the point of contact. In such circumstances, such indicators are not recommended for fishing in clear, calm, or shallow water.

Strike indicators in the art that are used for angling in clear, shallower water tend to be made from porous materials, such as foam or yarn, and cause fewer disturbances in the water when used. Unfortunately, these strike indicators can only be used for a brief period of time before they become ineffective, as their tendency to soak up water will cause them to lose buoyancy, making them unable to continuously suspend a line leader at a predetermined depth. In such circumstances, the angler must remove the saturated indicator from the water and either dry it or apply additional floatant material to it to give the indicator buoyancy. Such activities take time away from the activity of fishing.

In the foregoing circumstances, there is a desire for a strike indicator that achieves the consistency and longevity of trapped air indicators and the soft landing, low noise features of foam or yarn indicators.

SUMMARY

In view of the foregoing background, an innovative strike indicator is provided. The strike indicator includes a float having a plurality of interconnected sealed air enclosures radially arranged about a central aperture, each of the plurality of sealed air enclosures including an outer membrane and being entirely offset from the central aperture; and a shaft assembly comprising a shaft having a base and a fastener, the shaft being sized and shaped to extend through the central aperture, the base being located at a first end of the shaft and being sized and shaped to prevent the base from passing through the central aperture, and the fastener being securable to the shaft at a plurality of longitudinal positions. In one embodiment, the float has a vertical height and a float radius, wherein the ratio of the float radius to the vertical height is between 2:1 and 8:1. In one embodiment, the plurality of sealed air enclosures includes a first sealed air enclosure, a second sealed air enclosure, and a third sealed air enclosure, the first, second, and third sealed air enclosures being arranged in a triangular shape about the center of the float. In one embodiment, the central aperture is formed in a support panel that interconnects the first, second, and third sealed air enclosures, the central aperture defines a plurality of aperture flaps in the support panel that extend toward the center of the float and are sized and shaped to abut the shaft of the shaft assembly, and the plurality of aperture flaps define a Y-shape to the aperture. In one embodiment, each of the plurality of sealed air enclosures includes an outer membrane made from low-density polyethylene having a thickness that is less than or equal to 0.2 mm and a Young's Modulus between 100 MPa and 800 MPa. In one embodiment, the shaft of the shaft assembly includes a notch formed therein that extends into the shaft from a lateral end of the shaft and defines a prong in the shaft, the notch being either V-shaped or L-shaped. In one embodiment, the shaft of the shaft assembly is sized and shaped to fit multiple floats thereon between the base and the fastener.

A method of assembling a strike indicator is also provided. The method includes providing a first float and a second float, each of the first and second floats including a plurality of interconnected sealed air enclosures radially arranged about a central aperture; providing a shaft assembly including a shaft having a base and a fastener, the shaft being sized and shaped to extend through each central aperture of the first and second floats, the base being located at a first end of the shaft and being sized and shaped to prevent the base from passing through each central aperture of the first and second floats, and the fastener being securable to the shaft at a plurality of longitudinal positions; inserting the shaft of the shaft assembly through the central aperture of the first float; inserting the shaft of the shaft assembly through the aperture of the second float such that the first float abuts the second float; engaging the fastener to a second free end of the shaft; and positioning the fastener along the shaft.

BRIEF DESCRIPTION OF THE DRAWINGS

For a more complete understanding of the present invention, reference is made to the following detailed description of embodiments considered in conjunction with the accompanying drawings, in which.

DETAILED DESCRIPTION

Figure 1:
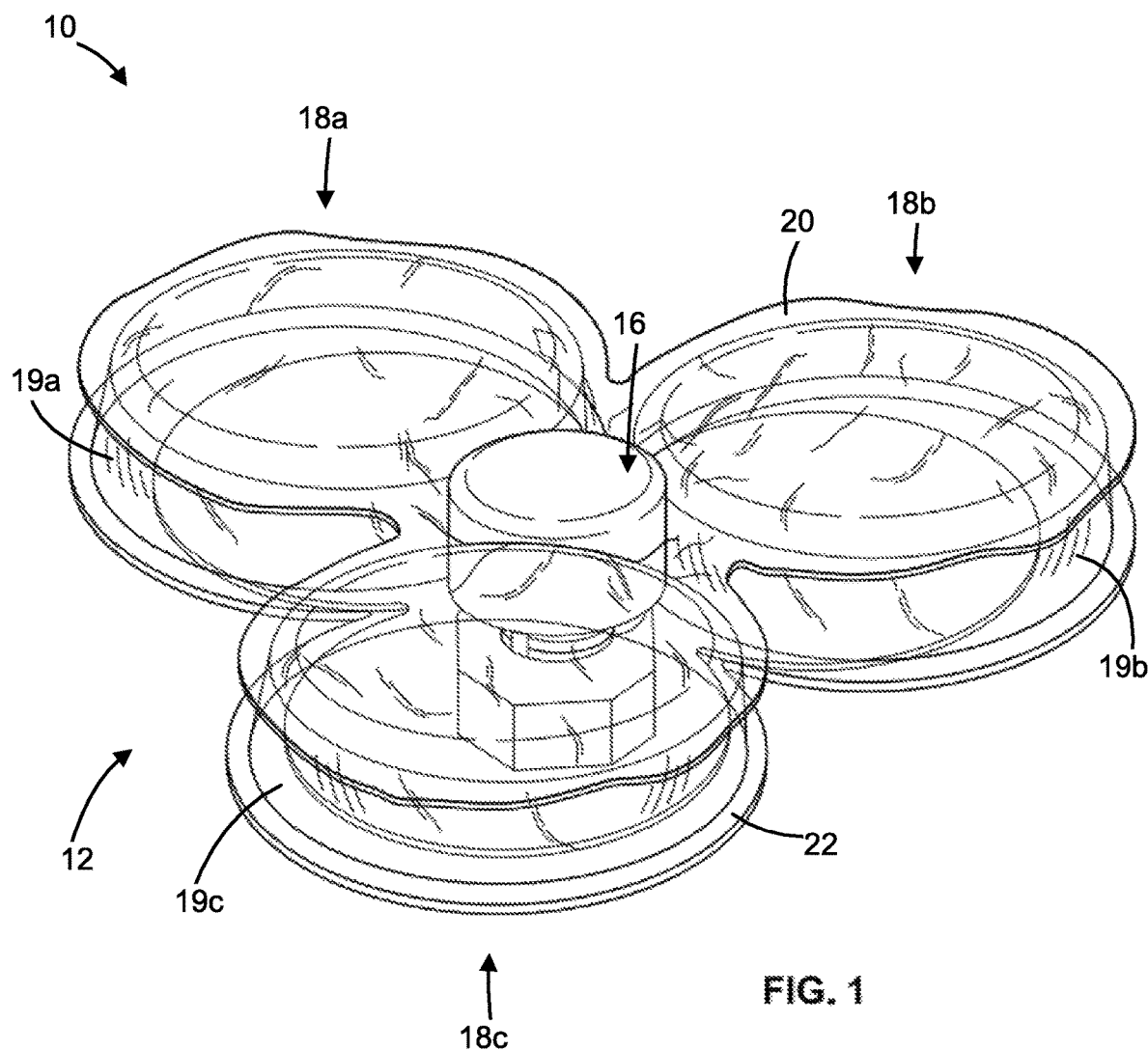
FIG. 1 is a top perspective view of a strike indicator constructed in accordance with an embodiment of the present invention.

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise stated. Additionally, the terms "comprises" and "comprising" when used herein specify that certain features are present in that embodiment, but should not be interpreted to preclude the presence or addition of additional features, components, operations, and/or groups thereof.

The following disclosure is intended to be read in connection with the accompanying drawings, which are to be considered part of the entire written description of the invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

In this application, "impermeable" refers to a material's ability to prevent diffusion of liquid or gas through the material at room temperature (i.e., between 15° C. and 25° C.).

Figure 2:
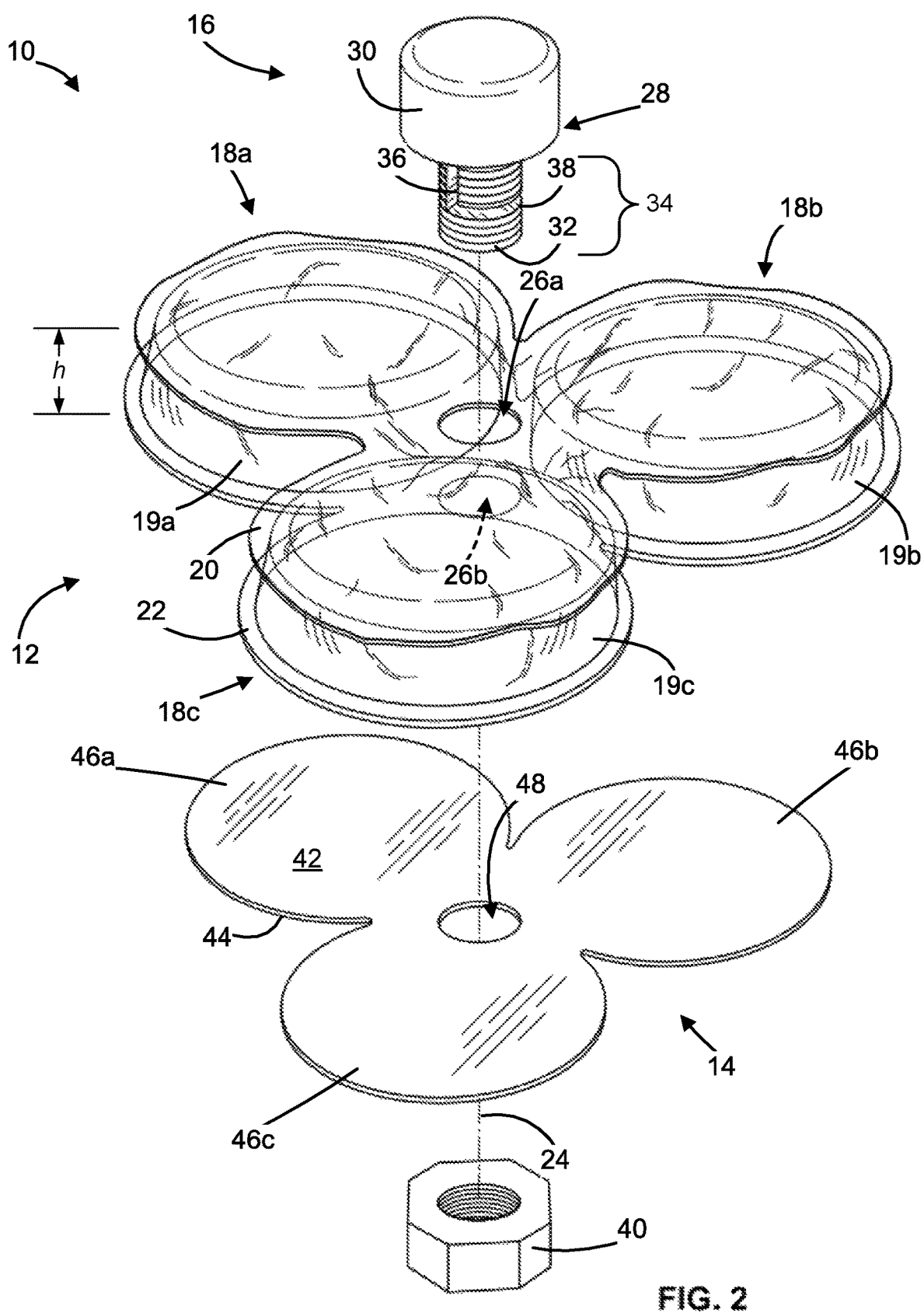
FIG. 2 is an exploded view of the strike indicator shown in FIG. 1.

Turning now to FIGS. 1 and 2, a strike indicator 10 for use in fly fishing and other types of angling is shown. The strike indicator 10 includes a float 12, a support panel 14, and a line attachment device 16. The float 12 comprises a plurality of sealed air enclosures 18a-c that are entirely offset from the center of the float 12 and are attached to each other by a top film 20 and a bottom film 22. The top film 20 is connected to the top surfaces of the sealed air enclosures 18a-c and the bottom film 22 is connected to the bottom surfaces of the sealed air enclosures 18a-c. Both the top film 20 and the bottom film 22 span the distances between the sealed air enclosures 18a-c and serve to provide structure to the float 12.

The sealed air enclosures 18a-c have membranes 19a-c that provide air-tight enclosures of sufficient volume to give the float 12 buoyancy. The sealed air enclosures 18a-c also have an internal air pressure equal to atmospheric pressure to allow for the float 12 to be capable of absorbing the shock of contacting water without bursting or causing significant disturbances in the water. The membranes 19a-c, the top film 20, and the bottom film 22 of the float 12 are made from a light, flexible, water-impermeable material, preferably a thermoplastic having a thickness less than or equal to 0.2 mm (0.008 inches), preferably less than or equal to 0.15 mm (0.006 inches), and a Young's Modulus between 100 MPa and 900 MPa, preferably between 100 MPa and 800 MPa. More preferably, the material of the float 12 is low-density polyethylene, having a thickness less than or equal to 0.1 mm (0.004 inches) and a Young's Modulus between 100 MPa and 400 MPa.

Figure 3:
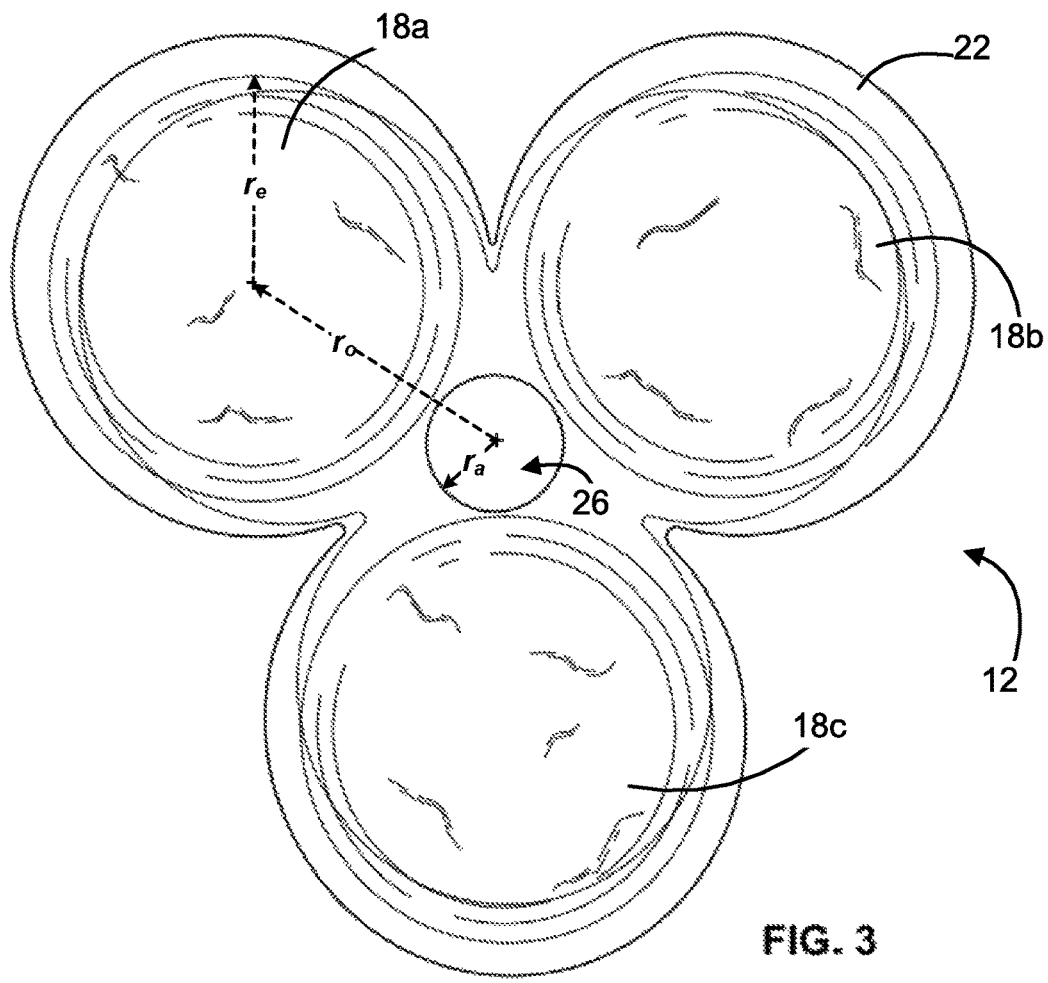
FIG. 3 is a top plan view of the float of the strike indicator shown in FIGS. 1 and 2.

As seen in FIGS. 2 and 3, the float 12 has a center axis 24 that vertically extends through the center of the float 12 between the sealed air enclosures 18a-c. An axial aperture 26 extends along axis 24 and through the top film 20 and the bottom film 22 (see top axial aperture 26a and bottom axial aperture 26b) and has an aperture radius $r_a$ that is sized and shaped to accommodate the line attachment device 16. This positioning of the line attachment device 16 provides balance to the float 12, as the amount of buoyancy provided by the sealed air enclosures 18a-c on one side of the line attachment device 16 is balanced by the buoyancy provided by the sealed air enclosures 18a-c on the opposing side of the line attachment device 16. Such balancing enables an angler to have a straighter cast, which prevents tangles in the line and allows the attached fly/bait/hook to quickly reach the desired water depth drag-free.

Still referring to FIGS. 2 and 3, the float 12 as a whole has a float radius $r_f$ equal to the distance between the center axis 24 and an outer edge of the float 12 furthest from the center axis 24 (i.e., outermost edge 13). Each of the sealed air enclosures 18a-c has an enclosure radius $r_e$, an offset radius $r_o$ equal to the distance between the center of the aperture 26 to the center of the sealed air enclosure (e.g., sealed air enclosure 18a), and a vertical height that is equivalent to the height h of the float 12. The offset radius $r_o$ must be greater than the combined lengths of the enclosure radius $r_e$ and the aperture radius $r_a$ to ensure that the sealed air enclosure 18a does not intersect with the aperture 26, and the float radius $r_f$ must be larger than the combined lengths of the offset radius $r_o$ and the enclosure radius $r_e$. In addition, to ensure that the float 12 provides sufficient buoyancy to keep the line attachment device 16, and therefore the line, substantially vertical while resting on the water, the offset radius $r_o$ of each of the sealed air enclosures is sized to be greater than or equal to the height h of each of the sealed air enclosures 18a-c. In one embodiment, the enclosure radius $r_e$ is also sized to be greater than or equal to the vertical height h of each of the sealed air enclosures 18a-c.

As seen in FIG. 1, the float 12 has a substantially thin profile where its height h is substantially smaller than its radius (i.e., float radius $r_f$). This thin shape and flexible nature of the float 12 reduces the wind resistance of the strike indicator 10 when it is cast with a fishing line and an attached fly. This enables a user to have a more comfortable, natural-feeling, and efficient cast, and makes casting a line a long distance easier. In one embodiment, the ratio of the float radius $r_f$ to the height h of the float 12 is between 2:1 and 8:1, preferably between 4:1 and 8:1 and more preferably between 6:1 and 7:1, to ensure that the float 12 achieves the advantages mentioned above while maintaining buoyancy. In addition, the ratio of the enclosure radius $r_e$ to the height h of each of the sealed air enclosures 18a-c is at least 1:1, preferably at least 3:2 and more preferably at least 2:1, to ensure that the float 12 achieves the advantages mentioned above while maintaining buoyancy. In one embodiment, the float 12 has the following approximate measurements: $r_f$=1.3 cm; $r_a$=0.2 cm; $r_e$=0.4 cm; and h=0.2 cm.

Figure 4:
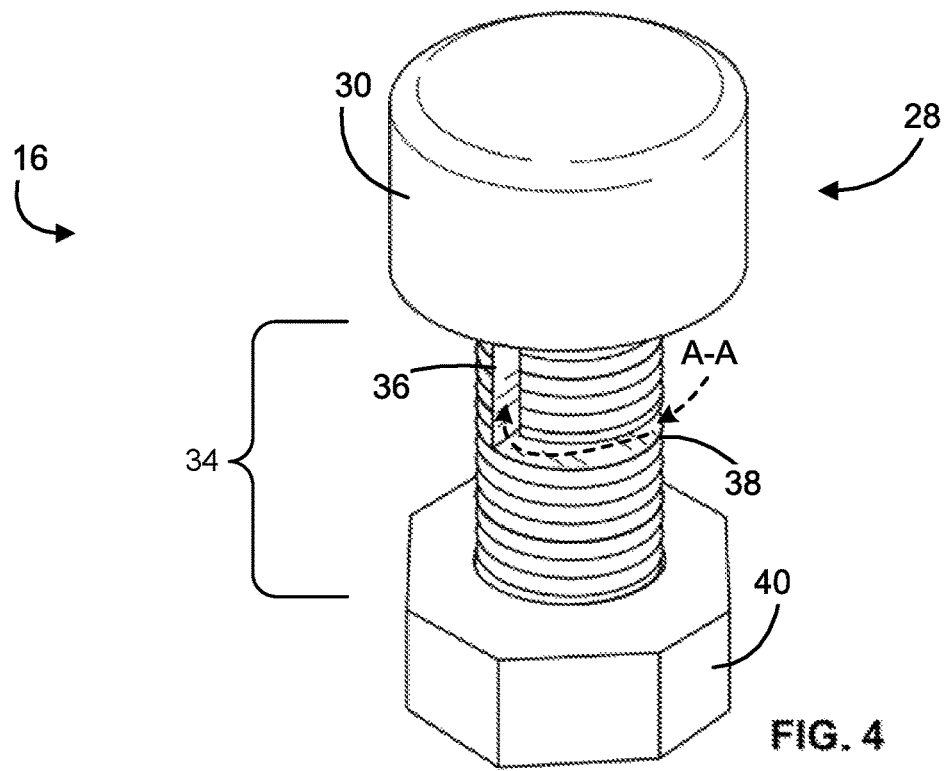
FIG. 4 is a perspective view of the line attachment device of the strike indicator shown in FIGS. 1 and 2.

Turning now to FIG. 4, the line attachment device 16 comprises a threaded bolt 28 having a base end 30 and an opposing free end 32, with a threaded shaft 34 extending therebetween. Within the threaded shaft 34 is a line leader notch 36 that begins at a lateral end 38 of the threaded shaft 34 and extends to the center axis of the threaded bolt 28. The line leader notch 36 then extends through the threaded shaft 34 along the center axis of the threaded bolt 28 to the base end 30, creating an L-shaped notch in the threaded bolt 28 through which a line leader may be inserted. The line attachment device 16 also includes a fastener in the form of a threaded nut 40 that engages with the free end 32 of the threaded bolt 28. In one embodiment, the threaded bolt 28 and threaded nut 40 are made from nylon. Other embodiments of the threaded bolt 28 and threaded nut 40 are made from acrylic, HDPE, polypropylene, polyvinyl chloride (PVC), and other thermoplastics, as well as rubber.

To attach the strike indicator 10 to a line leader, the threaded nut 40 is positioned on the threaded shaft 34 between the free end 32 and the line leader notch 36, and the line leader is inserted into the line leader notch 36 along line A-A, positioning the line leader within the line leader notch 36 against the base end 30. The threaded nut 40 is then rotated along the threaded shaft 34 toward the base end 30, eventually clamping the line leader between the threaded nut 40 and the base end 30 to secure the line leader to the line attachment device 16. When an angler wishes to remove the strike indicator 10, the threaded nut 40 is rotated in the opposite direction toward the free end 32 until the threaded nut 40 has surpassed the line leader notch 36. This allows the angler to remove the strike indicator 10 from the line leader without removing the threaded nut 40 from the threaded bolt 28 entirely, thereby reducing the risk of losing the threaded nut 40.

Referring back to FIGS. 1 and 2, the support panel 14 serves as both a backing for the float 12 and a slight weight to help orient the strike indicator 10 in an upright position while in water, thereby allowing the line leader to have a more vertical orientation under the water. The support panel 14 has a top surface 42 positioned adjacent to the float 12, a bottom surface 44, a clover-leaf shape with a plurality of petals 46a-c that correspond in number, size, and shape to the plurality of sealed air enclosures 18a-c, and a central aperture 48 that is coaxially aligned with the top and bottom axial apertures 26a, 26b. In one embodiment, the support panel 14 is transparent or translucent so that its appearance does not scare away fish. In another embodiment, the support panel 14 is colored to assist the angler in identifying where the strike indicator is on the water, as well as to disguise its presence to fish.

In addition to the ones discussed above, the strike indicator 10 offers many advantages over trapped air indicators of the prior art. For example, when attached to a line, the float 12 surrounds fishing line to balance its mass around all sides of the line. As a result, the drag experienced by the strike indicator 10 when cast is substantially balanced around all sides of the line. This enables the float 12 of the strike indicator 10 to act as a parachute for the fly/bait/lure when it falls to the water, which reduces the velocity of the strike indicator and minimizes disturbances in the water when the strike indicator 10 contacts the water, thereby reducing the chances of scaring away fish.

In addition, the material of the float 12 allows the strike indicator 10 to be low weight, highly flexible, and water impermeable, all of which create different advantages. The low weight of the strike indicator 10 allows the fly/bait/lure to be the heavier component of the fishing line such that the weight of the two combined is concentrated at the forward end of the fishing line, which keeps the strike indicator 10 from creating kinks in the line and/or causing the line to become tangled or knotted. The high flexibility of the float 12 allows the strike indicator 10 to land softly on water, as contact with the water will create more disturbances within the float 12 itself than with the water's surface. The water impermeability of the float 12 prevents the strike indicator 10 from absorbing water, which allows the strike indicator 10 to float on water and enables the angler to manipulate the strike indicator 10 on the water more easily (such as when mending or recasting). Furthermore, the shape and transparency of the float 12 operates as camouflage by allowing the strike indicator 10 to have the appearance of water bubbles floating along the water's surface, which reduces the likelihood that the strike indicator 10 will scare away fish during use.

Figure 5:
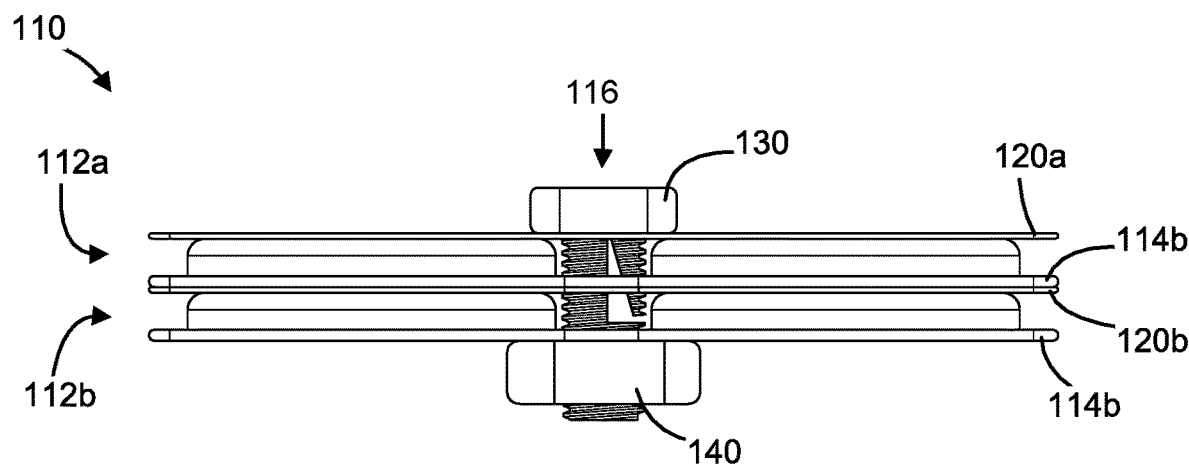
FIG. 5 is a side elevational view of a strike indicator constructed in accordance with a second embodiment of the present invention.
Figure 6:
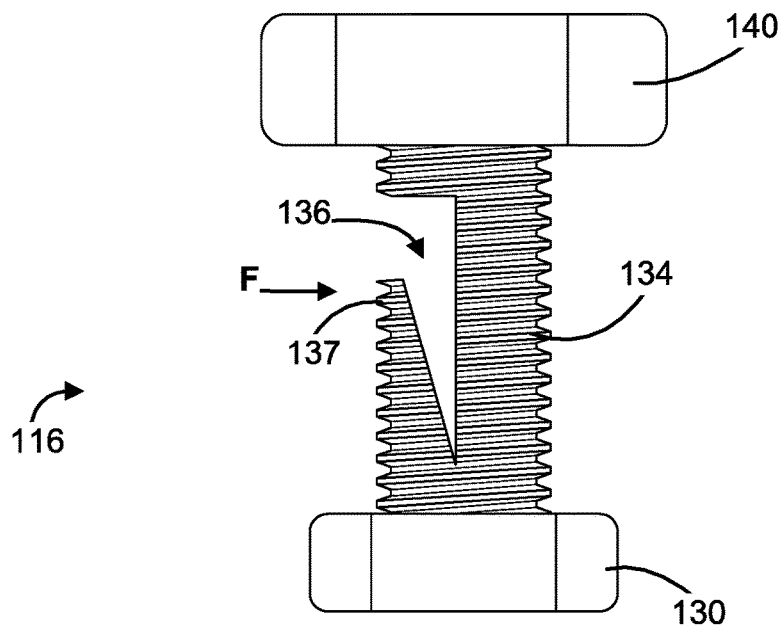
FIG. 6 is a side elevational view of the line attachment device of the strike indicator shown in FIG. 5.
Figure 7:
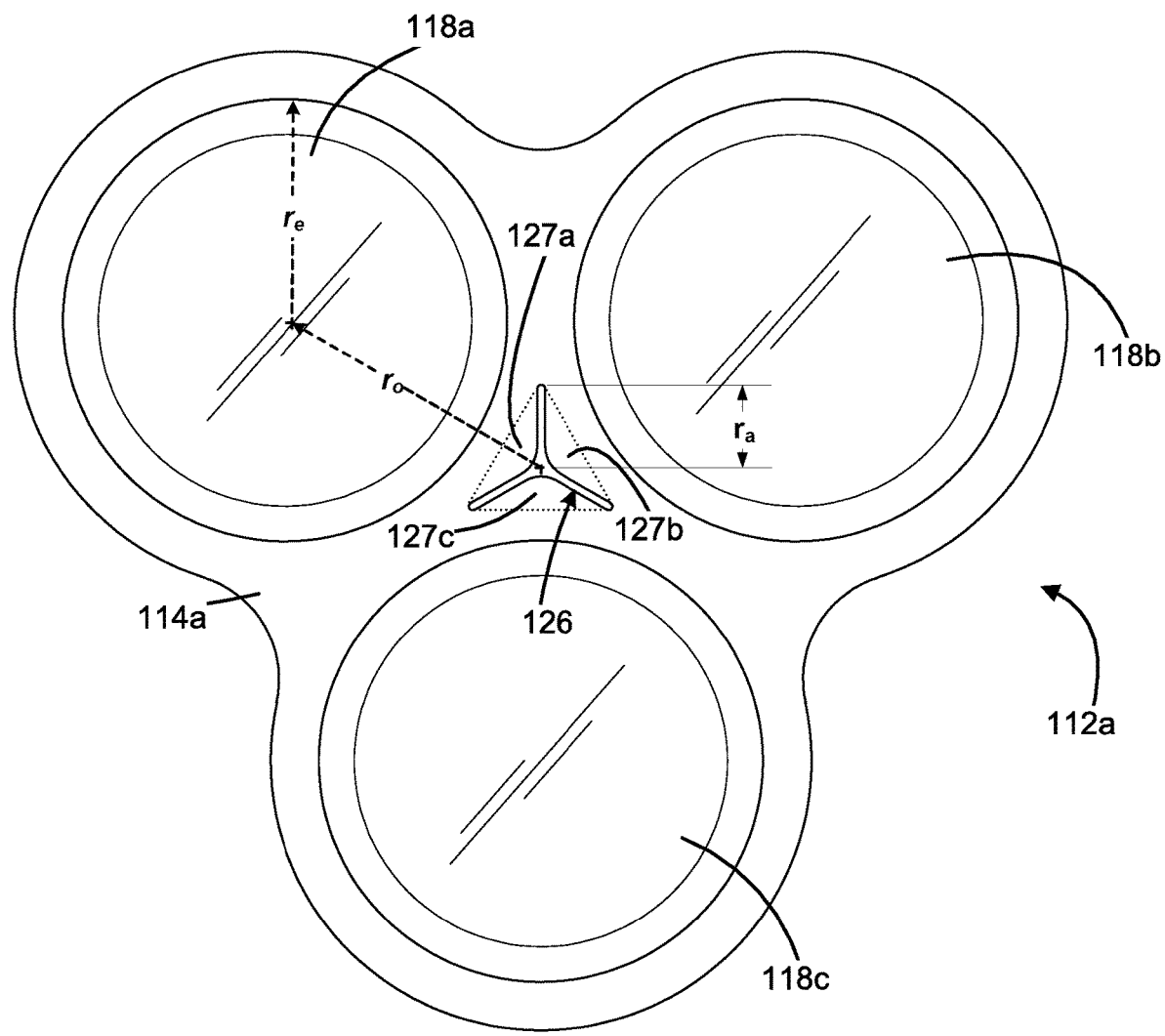
FIG. 7 is a top plan view of one of the floats for the strike indicator shown in FIG. 5.

FIGS. 5-7 illustrate a second embodiment of the present invention. The elements illustrated in FIGS. 5-7 which correspond, either identically or substantially, to the elements described above with respect to the embodiment shown in FIGS. 1-4 have been designated by corresponding reference numbers increased by one hundred. Any element referenced below and identified in the attached drawings should be assumed as having the same or similar structure and function as its corresponding element shown in previous figures, except where specifically indicated otherwise below.

FIG. 5 shows an example of a strike indicator 110 having more than one float. More particularly, the strike indicator 110 includes a first float 112a and a second float 112b that are stacked on top of one another to achieve an increased buoyancy over the single float strike indicator 10 shown in FIG. 1. The first and second floats 112a, 112b are fitted over the shaft 134 of a line attachment device 116 and secured in place by the threaded nut 140. In this embodiment, the first and second floats 112a, 112b each have a support panel (see first and second support panels 114a, 114b) attached to its bottom surface. The first and second support panels 114a, 114b are slightly more rigid than the upper films of the first and second floats 112a, 112b (see first and second upper films 120a, 120b), but still are made from materials having a Young's Modulus between 100 MPa and 900 MPa. The individual sealed air enclosures of the first and second floats 112a, 112b are similar in size and shape as those of the sealed air enclosures 18a-18c discussed above with respect to FIGS. 1-3.

As seen in FIG. 6, the line attachment device 116 includes a threaded shaft 134 extending from a base 130 and terminating at a free end (not shown), and a threaded nut 140 fitted onto the free end. The shaft 134 includes a notch 136 that extends into the shaft 134 from a lateral end 138 and extends through the shaft 136 toward the base 130. The notch 136 has a V-shape where the vertex of the V-shape is proximate to the base 130, leaving a resilient prong 137 that can be pressed in the direction of force F by the threaded nut 140 when the threaded nut 140 is fitted around the shaft 136 of the line attachment device 116. When attaching the line attachment device 116 to a fishing line or line leader, the line leader is inserted into the notch 136 of the line attachment device 116 and the threaded nut 140 is further rotated about the shaft 134 until it reaches the prong 137. At this point, the threaded nut 140 squeezes the shaft 136 and the prong 137, causing the prong 137 to move in the direction of force F and pinch or clamp the line leader within the notch 136 of the line attachment device 116. The V-shape of the notch 136 ensures a tight friction fit between the line leader and the walls of the notch 136 and prong 137 regardless of the thickness of the line leader placed therein.

FIG. 7 illustrates the first float 112a having an aperture 126 having a Y-shape, rather than the circular shape of the aperture 26 of the float 12 shown in FIG. 3. This Y-shape creates aperture flaps 127a, 127b, 127c formed in the support panel 114a that interact with the threads of the shaft 136 of the line attachment device 116. More particularly, when the shaft 136 of a line attachment device 116 is fitted through the aperture 126 of the float 112a, the aperture flaps 127a-c bend with the force of the moving shaft 136 and intermittently fit within each of the threads of the shaft 136 as it moves relative to the float 112a. This creates a greater friction fit between the float 112a and the line attachment device 116, ensuring that the float 112a does not loosely move up and down the shaft 136 of the line attachment device 116 in the event that a user did not fully tighten the threaded nut 140 against the surfaces of the float 112a. This Y-shape of the aperture 126 also allows the aperture radius $r_a$ of the first float 112a to be slightly larger than the aperture radius $r_a$ of the float 12 of the first embodiment strike indicator 10, which enables the sealed air enclosures 118a-118c to increase in radius $r_e$, and therefore buoyancy, while maintaining the same float radius $r_f$ as that of the float 12 of the strike indicator 10. Alternatively, this Y-shape allows the float to decrease in size by shrinking the float radius $r_f$ while maintaining the same enclosure radius $r_e$ of the sealed air enclosures 18a-18c of the float 12 of the strike indicator 10 by locating the sealed air enclosures 118a-118c closer to the center of the float 112a.

Many modifications can be made to the strike indicators 10, 110 without departing from the present invention. For example, while the embodiment shown in FIGS. 1, 2, 5 and 7 feature three sealed air enclosures 18a-c, 118a-c, a float may have as few as two sealed air enclosures and as many sealed air enclosures as a user desires, so long as the line attachment device 16, 116 is located in the middle of the float between all the sealed air enclosures. While FIG. 5 illustrates a strike indicator having first and second floats 112a, 112b, multiple additional floats can also be stacked on top of the first and second floats to achieve increased buoyancy. In addition, while the threaded nut 40 shown in FIG. 4 has a hexagonal shape to assist in manipulation, the threaded nut 40 may have alternative shapes, such as square or circular. While the base end 30 of the threaded bolt 28 is circular in shape, the base end 30 may also have alternative shapes, such as square or hexagonal. All such modifications are considered to be within the scope of the present invention.

All examples and conditional language recited herein are intended for pedagogical purposes to aid the reader in understanding the principles of the present invention and the concepts contributed by the inventor in furthering the art. As such, they are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the invention. All such variations and modifications are intended to be included within the scope of the invention, as defined by the following claims.

The invention claimed is:

1. A strike indicator for use with a fishing line, comprising:
    a float having a plurality of interconnected sealed air enclosures radially arranged about a central aperture; and
    a shaft assembly comprising a shaft having a base and a fastener, the shaft being sized and shaped to extend through the central aperture, the base being located at a first end of the shaft and being sized and shaped to prevent the base from passing through the central aperture, and the fastener being securable to the shaft at a plurality of longitudinal positions;
    wherein the shaft of the shaft assembly includes a notch formed therein arranged for receiving the fishing line, wherein the notch extends into the shaft from a lateral end of the shaft and defines a prong in the shaft wherein when secured thereover, the fastener is arranged to squeeze the shaft and prong together to clamp the fishing line within the notch.

2. The strike indicator of claim 1, wherein the float has a vertical height and a float radius, wherein the ratio of the float radius to the vertical height is between 2:1 and 8:1.

3. The strike indicator of claim 1, wherein the plurality of sealed air enclosures includes a first sealed air enclosure, a second sealed air enclosure, and a third sealed air enclosure, the first, second, and third sealed air enclosures being arranged in a triangular shape about the center of the float.

4. The strike indicator of claim 3, wherein the interconnected sealed air enclosures form a geometric shape, and wherein the strike indicator additionally comprises a support panel serving as a backing for the float and having a shape corresponding to the geometric shape of the interconnected sealed air enclosures.

5. The strike indicator of claim 4, wherein the support panel additionally comprises a plurality of aperture flaps sized and shaped to abut the shaft of the shaft assembly.

6. The strike indicator of claim 5, wherein the plurality of aperture flaps define a Y-shape to the aperture.

7. The strike indicator of claim 1, wherein each of the plurality of sealed air enclosures includes an outer membrane having a thickness that is less than or equal to 0.2 mm.

8. The strike indicator of claim 7, wherein the outer membrane has a Young's Modulus between 100 MPa and 800 MPa.

9. The strike indicator of claim 1, wherein the shaft of the shaft assembly includes a notch formed therein that extends into the shaft from a lateral end of the shaft and defines a prong in the shaft.

10. The strike indicator of claim 9, wherein the notch of the shaft has a shape selected from the group consisting of a V-shape and an L-shape.

11. The strike indicator of claim 1, wherein the shaft of the shaft assembly is sized and shaped to have more than one float positioned thereon between the base and the fastener.

12. The strike indicator of claim 1, wherein the float is adapted to float on a surface of water.

13. The strike indicator of claim 1, wherein the notch has a V-shape.

14. A method of assembling a strike indicator, the method comprising:

(a) providing a first float and a second float, each of the first and second floats including a plurality of interconnected sealed air enclosures radially arranged about a central aperture;

(b) providing a shaft assembly including a shaft having a base and a fastener, the shaft being sized and shaped to extend through each central aperture of the first and second floats, the base being located at a first end of the shaft and being sized and shaped to prevent the base from passing through each central aperture of the first and second floats, and the fastener being securable to the shaft at a plurality of longitudinal positions;

(c) inserting the shaft of the shaft assembly through the central aperture of the first float;

(d) inserting the shaft of the shaft assembly through the aperture of the second float such that the first float abuts the second float;

(e) engaging the fastener to a second free end of the shaft; and (f) positioning the fastener along the shaft.

15. The method of claim 14, wherein step (c) includes positioning the first float such that the base abuts the first float.

16. The method of claim 15, wherein step (f) includes positioning the fastener such that the fastener abuts the second float.

17. The method of claim 14, wherein the shaft of the shaft assembly includes a notch, and the method further comprises (g) inserting a fishing line into the notch of the shaft.

18. The method of claim 17, wherein the notch defines a prong in the shaft, and step (f) includes positioning the fastener against the prong of the shaft such that the prong clamps the fishing line within the notch.

* * * * *